April 18, 1961  G. L. NOLTER  2,980,753
BATTERY CONTACT ASSEMBLY
Filed June 19, 1958
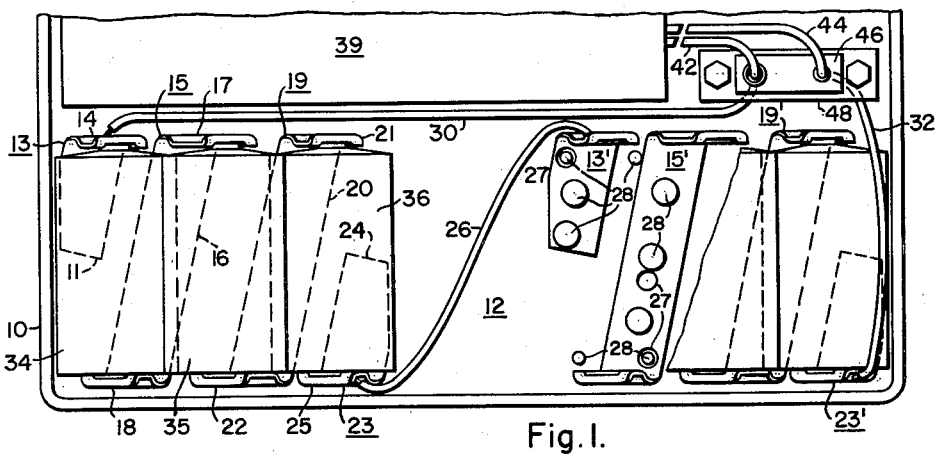
Fig.1.
Fig.2.
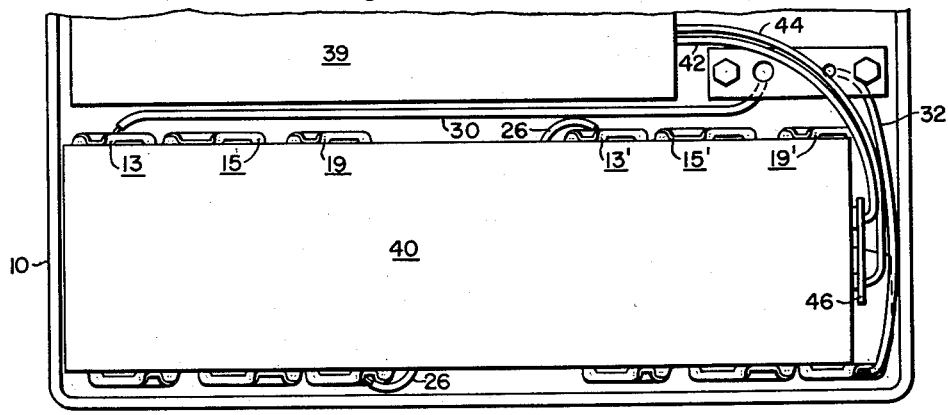
Fig.3.
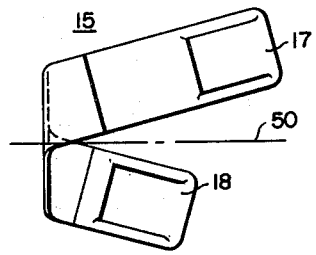
Fig.4.
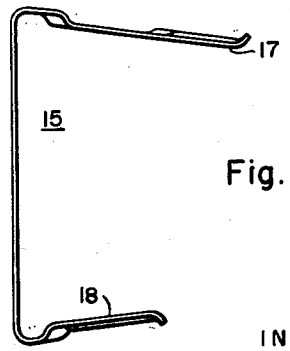
WITNESSES
Edwin E. Bassler
James F. Young
INVENTOR
George L. Nolter
BY
Benjamin DeWitt
ATTORNEY

United States Patent Office 2,980,753
Patented Apr. 18, 1961

2,980,753

BATTERY CONTACT ASSEMBLY

George L. Nolter, Cornwells Heights, Pa., assignor to Westinghouse Electric Corporation, East Pittsburgh, Pa., a corporation of Pennsylvania Filed June 19, 1958, Ser. No. 743,078

4 Claims. (Cl. 136—173)

This invention relates to radio receivers, and more particularly to radio receivers utilizing a plurality of batteries as a power source.

It is an object of this invention to provide an improved battery contact assembly.

It is another object of this invention to provide an improved battery contact assembly which is simply and economically manufactured.

A further object of this invention is to provide an improved battery contact assembly for mechanically supporting a plurality of batteries.

Still another object of this invention is to provide an improved battery contact assembly for connecting a plurality of batteries in series.

A still further object of this invention is to provide an improved battery contact assembly adaptable for use with various size batteries.

These and other objects of this invention will be apparent from the following description, taken in accordance with the accompanying drawing, throughout which like reference characters indicate like parts, which drawing forms a part of this application, and in which:

Figure 1 is a front view of a battery contact assembly in accordance with this invention showing a plurality of 1½ volt batteries assembled therewith.

Fig. 2 is similar to Fig. 1 except that a single 9 volt battery is shown therewith.

Fig. 3 is a top view of a single clip member in accordance with this invention; and Fig. 4 is a side view of the clip member shown in Fig. 3.

Referring in particular to Figs. 1 and 2, the battery contact assembly 12 comprises two groups of four clip members positioned on and secured to an insulating support member 10. Since both groups are identical, the following description applies to either group. The first clip member 13 includes a base portion 11 and a first leg portion 14. The second clip member 15 includes a base portion 16, a first leg portion 17 and a second leg portion 18. The third clip member 19 includes a base portion 20, a first leg portion 21 and a second leg portion 22. The fourth clip member 23 includes a base member 24 and a single leg portion 25. The fourth clip member 23 of the first group of clip members is connected to the first clip member 13' of the second group by lead wire 26. A dry cell battery is supported between and electrically contacting the first leg portion of one clip member and the second leg portion of an adjacent clip member. The end clip members 13 and 23 need be only half clip members. This is explained in more detail hereinafter.

The base portions of the clip members 13, 15, 19 and 23 are provided with a plurality of holes 27. The support member 10 is provided with a plurality of studs 28 in a pattern corresponding to the holes 27 in the clip members. The clip members are positioned on the support member 10 so that the studs 28 protrude through the holes 27 in the clip members. The studs 28 are then swaged over so as to secure the clip members to the support member 10. In this way, the clip members are automatically positioned with respect to each other.

Referring specifically to Fig. 1, the first battery 34 is positioned between the first leg portion 14 of the first clip member 13 and the second leg portion 18 of the second clip member 15. The second battery 35 is positioned between the first leg portion 17 of the second clip member 15 and the second leg portion 22 of the third clip member 19. The third battery 36 is positioned between the first leg portion 21 of the third clip member 19, and the single leg portion 25 of the fourth clip member 23. Additional batteries are positioned between the clip members of the second group of four in a similar manner. All of the first leg portions 14, 17 and 21 of the clip members 13, 15 and 19 lie in a first plane substantially perpendicular to the base portions 11, 16, 20 and 24 of the clip members, and all of the second leg portions 18, 22 and 25 lie in a second plane substantially parallel to the first plane. The first leg portion 17 of the second clip member 15 and the second leg portion 22 of the third clip member 19 are longer than the other leg portions so that the second battery 35 is positioned above the first and third batteries 34 and 36 in a pyramid fashion. This arrangement permits the conservation of space, which is vital in portable type radios and the like. The batteries 34, 35 and 36 are placed between the leg portions of the clip members so that the positive poles of the batteries respectively engage the first leg portions 14, 17 and 21. The batteries are thus connected in series and the output voltage available at clips 13 and 24 will equal the number of batteries multiplied by the voltage output of each battery.

The extreme end half clip members 13 and 24' of the contact assembly 12 are respectively connected by means of wire leads 30 and 32 to a plug receptacle 48 and through leads 42 and 44 to the instrument which is powered by the battery source, such as a radio receiver chassis 39. It is not essential that the battery contact assembly be arranged in two group of four clips as shown, but the assembly may comprise a continuous series of battery clip members, if so desired, with only the extreme end clip members 13 and 24' being half clip members. The insulating support member 10 may be a separate sheet of insulating material or may form a part of the inner wall of the cabinet of the radio receiver.

Fig. 2 shows the same battery contact assembly 12 as Fig. 1 with the exception that a single 9 volt battery 40 is positioned between the leg portions of the clip members. The clip members in this instance are used to mechanically support the battery 40. The battery 40 is connected to the receiver 39 by leads 42 and 44 which extend from the receiver to plug 46. The plug 46 connects directly to the 9 volt battery 40 when the arrangement of Fig. 2 is used.

Fig. 3 shows a top view of a single clip member 15 which is representative of the second clip member 15 shown in Fig. 1. The first leg portion 17 extends at an angle with respect to the base portion 16 so that substantially all of the first leg portion 17 lies on one side of a medial plane 50 which includes the longitudinal axis of the base portion 16 and is perpendicular to the base portion 16. The second leg portion 18 extends at an angle with respect to the base portion 16 so that substantially all of the second leg portion 18 lies on the opposite side of the medial plane 50 with respect to the first leg portion 17. The angle between the first leg portion 17 and the second leg portion 18 is approximately 30°. The arrangement as shown in this figure permits the first and second leg portions 17 and 22 of adjacent clip members as shown in Figs. 1 and 2 to lie opposite each other and thereby permits a battery to be positioned between the two leg portions 17 and 22 of adjacent clip members 15 and 19. It is not essential that the leg portions 17 and 18 be of different lengths. If all the leg portions 17 and 18 are of the same length, the batteries 34, 35 and 36 will lie so that a plane passing through the axes of the batteries will be substantially parallel to the plane of the support member 10.

Fig. 4 is a side view of the clip member of Fig. 3, showing the clip member 15 as having a first leg portion 17, a base portion 15, and a second leg portion 18. A first plane including the first leg portion 17 is substantially parallel to a second plane including the second leg portion 18, both planes being substantially perpendicular to the base portion 16.

The arrangement described above provides a simple and economical battery contact assembly. By inserting the batteries between the contacts all in the same direction, the circuit is completed and the desired output voltage will result. As a consumer product this arrangement is particularly advantageous since it enables replacement of the batteries without requiring the consumer to have any knowledge of the manner in which batteries should be connected in series. This assembly is also advantageous in that it permits a single 9 volt battery to be utilized in place of a plurality of smaller batteries.

While the present invention has been shown in one form only, it will be obvious to those skilled in the art that it is not so limited but is susceptible of various changes and modifications without departing from the spirit and scope thereof.

I claim as my invention:

1. In a radio receiver for utilizing a plurality of batteries in series connection, the combination of a rigid insulating support member, a plurality of one-piece U-shaped conducting clip members, each having a substantially planar base portion, a first leg portion at one end of the base portion and a second leg portion at the other end of said base portion with said base portions being secured to said support member, all of said first leg portions lying in a first plane substantially perpendicular to said base portions, all of said second leg portions lying in a second plane substantially parallel to said first plane and spaced therefrom, each of said first leg portions extending outwardly from said support member at an acute angle thereto, so that the outer end of each first leg portion lies on one side of a medial plane perpendicular to said support member which passes through the longitudinal axis of the corresponding base portion, and each of said second leg portions extending from said support member at an acute angle, so that the outer end of each second leg portion lies on the opposite side of said medial plane with respect to said first leg portion.

2. In a radio receiver for utilizing a plurality of batteries in series connection, the combination of a rigid insulating support member, a plurality of one-piece U-shaped conducting clip members, each having a base portion, a first leg portion and a second leg portion with said base portions being secured to said support member so that all of said first leg portions lie in a first plane substantially perpendicular to said base portion and all of said second leg portions lie in a second plane substantially parallel to said first plane and spaced therefrom, each of said first leg portions extending outwardly from said support member at an acute angle thereto so that substantially all of the outer end of each first leg portion lies on one side of a medial plane perpendicular to said base portion which includes the longitudinal axis of said base portion, and each of said second leg portions extending outwardly from said support member at an acute angle so that substantially all of each second leg portion lies on the opposite side of said medial plane from the first leg portion of the same clip member, the angles at which said first and second leg portions extend being such that the first leg portion of one clip member is positioned opposite the second leg portion of an adjacent clip member, so as to accommodate a battery therebetween with the axis of the battery being substantially perpendicular to the plane of all said first leg members.

3. In a radio receiver utilizing a plurality of batteries in series connection, the combination of a rigid insulating support member, and a plurality of one-piece U-shaped conducting clip members, each of said clip members having a base portion secured contiguous to said support member and first and second leg portions extending outwardly from the opposite ends of said base portion, all of said first leg portions lying in a first plane substantially perpendicular to said support member, all of said second leg portions lying in a second plane substantially parallel to said first plane and spaced therefrom, each of said first leg portions extending at a non-perpendicular angle with respect to the common plane of said base portions such that substantially all of each first leg portion lies on one side of a medial plane perpendicular to said common plane and including the longitudinal axis of the base portion of the same clip member, and said second leg portion of the same clip member extending at a non-perpendicular angle with respect to said common plane such that substantially all of said second leg portion lies on the opposite side of said medial plane from said first leg portion.

4. In a radio receiver utilizing a plurality of batteries in series connection, the combination of a rigid insulating support member, and a plurality of one-piece U-shaped conducting clip members, each of said clip members having a base portion secured contiguous to said support member and first and second leg portions extending outwardly from the opposite ends of said base portion, all of said first leg portions lying in a first plane substantially perpendicular to said support member, all of said second leg portions lying in a second plane substantially parallel to said first plane and spaced therefrom, each of said first leg portions extending at a non-perpendicular angle with respect to the common plane of said base portions, so that substantially all of each first leg portion lies on one side of a medial plane perpendicular to said common plane and including the longitudinal axis of the base portion of the same clip member, and the second leg portion of the same clip member extending non-perpendicular with respect to said common plane, so that substantially all of said second leg portion lies on the opposite side of said medial plane from said first leg portion of the same clip member, the angles at which said first and second leg portions extend being such that the first leg portion of one clip member is positioned opposite the second leg portion of an adjacent clip member, so as to accommodate a battery therebetween with the ends of the battery respectively engaging said last mentioned first and second leg portions and with the axis of the battery being substantially perpendicular to said first and second planes.

References Cited in the file of this patent

UNITED STATES PATENTS

| 1,470,917 | Goss | Oct. 16, 1923 |

FOREIGN PATENTS

| 372,937 | Germany | Apr. 5, 1923 |
| 310,570 | Great Britain | May 2, 1929 |
| 229,413 | Great Britain | Feb. 26, 1925 |
| 250,375 | Great Britain | Apr. 15, 1926 |
| 166,958 | Switzerland | Jan. 31, 1934 |